United States Patent [19]

Franz

[11] 3,944,440

[45] Mar. 16, 1976

[54] SELECTIVE REFLECTING METAL/METAL OXIDE COATINGS USING SURFACTANT TO PROMOTE UNIFORM OXIDATION

[75] Inventor: Helmut Franz, Pittsburgh, Pa.

[73] Assignee: PPG Industries, Inc., Pittsburgh, Pa.

[22] Filed: May 17, 1974

[21] Appl. No.: 470,768

Related U.S. Application Data

[62] Division of Ser. No. 252,803, May 12, 1972, Pat. No. 3,846,152.

[52] U.S. Cl. .............. 148/6.3; 148/6.31; 148/6.35; 427/299; 427/165; 427/167; 252/407; 427/305
[51] Int. Cl.$^2$......................................... C23C 11/00
[58] Field of Search.......... 148/6.27, 6.14 R, 26, 27, 148/28, 30, 6, 152, 25, 13.2; 117/49; 106/244; 427/167, 165, 227, 299

[56] References Cited
UNITED STATES PATENTS

| | | | |
|---|---|---|---|
| 1,310,020 | 7/1919 | Huestis | 148/29 |
| 1,602,274 | 10/1926 | Lewis | 148/28 |
| 2,015,424 | 9/1935 | Forst | 148/6 |
| 2,359,799 | 4/1938 | Shoemaker | 117/49 |

*Primary Examiner*—John D. Welsh
*Attorney, Agent, or Firm*—E. Kears Pollack

[57] ABSTRACT

Metal/metal oxide coated articles having selective reflectance and transmittance of radiation over an extended spectral range are provided by a combination of alternately disposed coating layers of metal and metal oxide, the metals of the metal layer being silver, chromium, iron, cobalt or nickel and the metal oxide being copper oxide. Chemical or electroless plating techniques are disclosed for the production of such articles. Uniform oxide coatings are formed by first depositing metal films, then treating them with surfactants to promote uniform oxidation and then exposing them to an oxidizing environment.

7 Claims, 7 Drawing Figures

SELECTIVE REFLECTING METAL/METAL OXIDE COATINGS USING SURFACTANT TO PROMOTE UNIFORM OXIDATION

This is a division, of application Ser. No. 252,803, filed May 12, 1972. That application is now U.S. Pat. No. 3,846,152 issued Nov. 5, 1974.

CROSS-REFERENCE TO RELATED APPLICATIONS

This application is related to the applicant's copending application "Angled Crossfire Rinses" filed July 6, 1971, Ser. No. 159,746 and is related to the commonly assigned applications of R. G. Miller, filed July 23, 1970, Nos. 57,451, 52,575 and 57,754 application Ser. No. 57,575 is now abandoned; application Ser. No. 57,451 is now U.S. Pat. No. 3,723,158 issued Mar. 27, 1973; application Ser. No. 57,754 is now U.S. Pat. No. 3,674,571 issued July 4, 1972.

BACKGROUND OF THE INVENTION

This invention relates to multiple coated articles exhibiting selective reflectance and transmittance of radiation over an extended spectral range, and more particularly relates to visibly transparent articles having such selective reflectance. In another embodiment, this invention relates to an electroless coating method for producing such articles.

In the past, multiple layer coatings have been employed which provide particular reflectance and transmittance characteristics for the composite film. Exemplary of this prior art is the basic work of G. L. Dimmick, for example, U.S. Pat. Nos. 2,379,790, 2,412,496, 2,422,954 and 2,624,238. Particular coating materials employed in the prior art and disclosed in these references are a relatively high index refraction material selected from lead molybdate, lead tungstate, lead chromate, titanium dioxide, magnesium oxide, lead oxide, bismuth oxide and preferably zinc sulfide and a low index of refraction material selected from magnesium fluoride, calcium fluoride, calcium silicate, lithium fluoride, aluminum fluoride, aluminum oxide and preferably thorium oxyfluoride (cryolite). In the application of such layers according to the prior art, it is necessary to employ vaporization techniques or other techniques requiring a vacuum. The techniques of this prior art are not particularly effective for the production of coatings on large substrates, such as those intended for viewing closures in buildings or vehicles.

Other workers in the art have modified the basic concepts of Dimmick to include metal films or foil and semimetal films in combination with the particular high index of refraction materials taught by Dimmick. Exemplary of disclosures relating to these modifications is U.S. Pat. No. 3,516,720 which discloses the use of two metal films in combination with layers of high index of refraction material according to Dimmick where the particular metal films are a nickel film and a gold or copper film separated by a layer of zinc sulfide. As with the articles and techniques of Dimmick, the preparation of these combination films or coatings are practically limited to their preparation on small substrates such as the sunglasses which are prepared according to this reference.

In the preparation of metallic films on large substrates, there has been a large body of teaching relating to preparation of such coatings by electroless techniques which have developed from the art of the preparation of mirrors. Exemplary of such teachings are U. S. patents to Richard G. Miller for the preparation of copper films, U.S. Pat. No. 3,457,138, and copending applications for the preparation of iron, cobalt and nickel films, Ser. No. 57,451 and Ser. No. 57,754, filed July 23, 1970, which are herein incorporated by reference.

It has also been known in the past to prepare copper coatings on large substrates with the outer or exposed portion of the film oxidized so that a composite copper oxide/copper film results; see U.S. Pat. No. 3,537,944. The copper oxide coatings so produced are not found to provide for a variety of products having different characteristics which may be modified at will by simple control of the process for forming such coatings. Such coatings do not appear to have a sharp plane of demarcation between the copper oxide and the copper, but instead appear to have a gradual change from copper oxide to copper through their thickness and are not found adaptable for providing specific interference colors.

SUMMARY OF THE INVENTION

According to this invention, substrates, in particular transparent substrates such as glass, have been provided with multiple coatings to provide the articles with selective reflectance and transmittance properties for radiation over an extended spectral range. At least two coating or film layers are required in accordance with this invention. One layer comprises at least one metal, for example, silver, chromium, iron, cobalt, or nickel, or mixtures of such metals substantially in a reduced metallic state. The metal may be present alone or in the presence of other ingredients, such as phosphorous or boron, present in small quantities as the result of chemical reduction using compounds containing such elements as reducing agents for the metal comprising the principal constituent in the coating. Other impurities may also be present depending upon the particular method employed to apply the principal metal to the substrate or to the surface to which it is attached. Typically, tin or palladium may be present in small quantities within the metal coating.

A second coating or film layer comprising the oxide of at least one metal, preferably copper or iron, is affixed to the described metal coating. Copper has been found to be vastly superior to any other metal for the preparation of the oxide coatings of this invention. While it is preferred that the metal coating be affixed to the substrate and the metal oxide coating disposed over the metal coating, it is also possible to have the metal oxide layer adjacent to the substrate and the metallic coating disposed over the metal oxide layer. Further, more than two layers may be employed in some instances with alternate layers of metal oxide and metal films preferred but with the possibility of metal/metal oxide combinations in accordance with the preferred embodiments of this invention also being conveniently used in combination with other metal or metal oxide films, such as protective silica coatings covering the exposed face, whether metal or metal oxide, in accordance with the preferred embodiments of this invention.

The articles of this invention may be prepared using any convenient material as a substrate which is or may be made receptive to the deposition of the contemplated films. Substrates which may be useful for particular purposes include metals, porcelain, porcelain and enamel coated metals, refractory materials, glass and organic polymeric materials, such as plastics. Particularly useful articles are prepared for use as viewing closures utilizing glass as a substrate. While any known glass may be employed in this invention, the articles are preferably prepared utilizing common soda-lime-silica glasses. In particular, clear glass may be used as a substrate, although tinted and heat absorbing glasses may also be used to advantage.

Articles produced according to this invention for employment as windows in buildings and the like, preferably are prepared having two layers of film with the metal film adjacent the substrate. The thickness of the metal film may range from 20 to 1000 Angstroms, and preferably will be from about 50 to 200 Angstroms. The metal oxide coating will generally have a thickness of from 50 to 1500 Angstroms, and preferably will have a thickness from 200 to 900 Angstroms.

While the articles of this invention, if prepared having the metal oxide layer as the exposed coated surface, have been found to be relatively durable, in some applications, it is preferred to employ the coated glass in a multiple glazed window unit with the coated surface facing the interior space between adjacent panels of such multiple glazed units. When employing such multiple glazed units in the wall of a building, it is preferred to position such units so that the coated glass is disposed towards the exterior of the building, for such an arrangement enhances the thermal isolation of the interior of the building from the external environment under general weather conditions.

In order to obtain articles having particular reflectance and transmittance characteristics and in particular exhibiting desired color characteristics when viewed either in reflection or transmittance, the relative thickness of metal and metal oxide films is controlled. A wide variety of color characteristics are possible utilizing the principles of this invention. For example, when viewed from the coated side, articles of this invention may be observed to have colors which appear as greenish-silver, bronze, gold and gray. Reflectance of such articles from the glass side, when employing clear soda-lime-silica glass as a substrate, may vary from blue to violet to blue-green and the apparent color of such articles viewed in transmission may be silver, gold, brass, yellowish-bronze, or yellow-brown. Quantitatively, the colors of articles according to this invention may be expressed using the conventions of the conventional C.I.E. color system and using the parameters of reflectance, dominant wavelength, excitation purity and tristimulus values.

The preferred two-layer coated articles according to this invention have the following quantitative color characteristics: preferably articles having two layers of film, one metal and one metal oxide, on a glass substrate have a visible light or luminous transmittance of from 85 to 95 percent. Most preferably, such articles will be prepared using a clear soda-lime-silica glass, and the article will have in addition to the aforementioned characteristics a luminous reflectance from the glass substrate side of from 5 to 35 percent, and a color reflectance from the glass substrate side of from 560 to 580 nanometers dominant wavelength, from 5 to 35 Y tristimulus value, and from 2 to 20 percent excitation purity.

Measurement of the characteristics of the articles of this invention is accomplished using a Beckman Model DK-2A Spectrometer. The "total solar" reflectance and transmittance are integrated values for response over the spectral range from 300 nanometers to 2100 nanometers. The "luminous" reflectance and transmittance are integrated values for response over the spectral range from 380 nanometers to 760 nanometers. Transmittance is expressed as the percent of light transmitted through the specimen tested compared with the light transmitted through air. Reflectance is expressed as the percent of light reflected from the specimen tested compared with the light reflected from a flat, white, magnesium oxide block.

Characteristics are determined according to responses calculated for illumination by standard Illuminants "B" and "C". Tristimulus Y or reflectance, dominant wavelength and excitation purity follow convention.

The thickness of films or coating layers is determined by standard interferometric technique. The interferometer employed is a Sloan M-100 Angstrometer.

Considering the present invention in another aspect, a method is provided for preparing the multiple layer coated articles described which is readily applicable to the preparation of coated articles having large surface areas, for example, greater than 12 inches by 12 inches and even greater than 10 feet by 10 feet. The method for preparing such articles in accordance with this invention does not suffer from the problems attendant to the preparation of narrow band filters, such as taught in the prior art according to Dimmick and others, which require the deposition of films in a vacuum and require the close monitoring of deposition during the preparation of such articles. Such problems are also common to the method of preparing a copper/copper oxide composite film which is described above.

The metallic film or coating on which a metal oxide coating is to be formed may be applied by electroless plating, electrolytic plating, vapor deposition, sputtering or any other known technique. For example, a metallic coating of chromium may be conveniently applied by vapor deposition, while a silver coating may more conveniently be applied by electroless coating. The following description indicates a preferred method for forming the metallic coating of particular metals by electroless plating.

The metal coating comprising nickel, cobalt, iron or some mixture thereof along with other materials in relatively minor amounts is applied to the substrate by contacting it with a mixture comprised of two compositions which are held separate from one another until immediately before or at the time of contacting the substrate. One composition is a solution containing the metal to be deposited, preferably as a reducible metal salt, soluble or easily dispersible in the medium, preferably water, for supplying the reactant; and a second composition, preferably containing a boron-containing reducing agent for the metal, though other reducing agents will be apparent to those skilled in the art.

Prior to contacting the substrate with such a composition mixture, the substrate will preferably be cleaned in order to enhance the uniformity of the resultant coating. Substrates, which are not metallic and are not receptive to the deposition of an adherent film, are then contacted with a composition to make the surface receptive to coating. Such so-called sensitizing compositions customarily contain a tin compound such as a tin halide or sulfate, and stannous chloride is the preferred material for sensitizing glass surfaces. A further sensitizing step utilizing a noble metal, preferably palladium, may also be employed, and, while palladium may be supplied as any palladium halide, palladious chloride in combination with an equal amount of hydrochloric acid in an aqueous solution is preferred for preparing glass surfaces.

Following one or more contacting steps to provide a film of iron, cobalt, or nickel on a glass substrate, the glass substrate is coated with copper or iron, preferably copper, by contacting it with a copper-containing composition and a reducing agent for the copper. Preferably an alkaline copper salt solution, for example, a solution comprising copper sulfate, will be used along with a reducing agent, such as formaldehyde, dextrose and invert sugar, preferably formaldehyde. A small quantity of nickel or cobalt is preferably present as a soluble salt with particularly preferred salts being sulfates and tartrates. The method includes contacting the glass with a Rochelle salt at a controlled pH to reduce the copper, depositing it on a copper film over the metallic silver, iron, cobalt or nickel film. Prior to the second coating application the first coating is preferably activated by contacting it with a palladium salt as before.

Following such treatment, the coated article is subjected to heat, preferably above about 400°F and below a temperature at which the substrate becomes distorted in an oxidizing atmosphere to convert the copper layer to copper oxide. As disclosed and claimed herein, the best mode for practicing the method of the present invention contemplates contacting the film to be oxidized with an adsorbing surfactant prior to heat treatment in an oxidizing atmosphere in order to enhance the uniformity of oxidation and the apparent uniformity of the resulting film as visually observed.

In another aspect of the present invention, a method is provided for preparing a thin metal oxide film on a substrate with the resulting film having superior uniformity. Also provided for in this invention is a method of oxidizing the surface of the metal article to a controlled depth in a manner which provides for uniform oxidation over the surface.

It has been found that uniformity of oxidation of a metal is enhanced by treating the metallic surface to be oxidized with a surfactant material which is strongly adsorbed at the metal surface so that the surface is made hydrophobic, that is, non-wetting. It has been found that metal surfaces which have been so treated, when heated to 200°F to 800°F and preferably 300°F to 500°F, in the presence of air, are oxidized uniformly over the surface. While it is not fully understood why the presence of an adsorbing surfactant promotes the uniformity of oxidation, it is thought that the presence of an adsorbing surfactant provides a uniformly thin layer of surfactant over the metal surface and that the rate of oxidation is thus controlled by the rate of oxygen diffusion through the surfactant to the metal surface which is thought to be relatively uniform compared to the contact of oxygen with the metal surface directly. It is thought that when the bare metal surface is exposed to air that inherently some air turbulence exists which causes the oxidation rate to be non-uniform over the surfaces. It has been observed that metal surfaces treated with an effective absorbing surfactant are hydrophobic even after heat treatment for 20 minutes at about 500°F. This indicates that the surfactant is maintained on the surface during the oxidation of the underlying metal.

This method is applicable to the oxidation of metals, such as copper, aluminum, zinc, iron, cobalt, nickel, tin, indium and the like, whether in solid form or as relatively thin films disposed on other materials. Thin metallic films such as films over other articles prepared by either plating over opaque articles or prepared by various techniques as thin transparent films on transparent substrates may be oxidized in place according to this invention.

The following surfactants are exemplary of those found to be useful in the practice of this invention: sorbitan monolaurate, and acetylene glycol 2,4,7,9-tetramethyl-5decyne-4,7 diol in ethylene glycol sold under the name "Surfinol" by Airco Chemical. Any surfactant which is strongly adsorbed at a metal surface and which is stable at temperatures high enough to promote oxidation of the metal in air may be employed in the present invention. Non-ionic surfactants which have been tested have been found to be useful. Sorbitan monolaurate has been found to be particularly useful as a surfactant to be employed in the oxidation of copper. In the practice of this invention the adsorbing surfactants are appplied to the metal surface from solution. Either aqueous or organic solutions may be employed. While useful surfactants may be applied in full strength, it is preferable to apply the surfactants from solution. It is preferred that such solutions contain from 0.001 to 20 percent by weight surfactant, and solutions containing 0.05 to 5 percent by weight surfactant are more preferred, with the concentrations indicated in the examples, which follow, being particularly desirable.

In addition to the surfactants employed in the invention, solutions may contain alkali metal salts, for example, alkali metal carbonates, sulfates, phosphates, nitrates and the like are contemplated. In particular the sodium salts may be effectively used. Preferably the alkali metals are present as sodium carbonate, tetra sodium pyrophosphite and the like.

BRIEF DESCRIPTION OF THE DRAWINGS

As illustrated in FIG. 3, the number of metal and metal oxide layers may be increased for particular effect. An overlayer, 9, may be provided which is metallic or oxide for particular optical performance or an overlayer, 9, of silica may be provided for protection of the principal coating layers, 5 and 7. A preferred article incorporating the combinations of coatings disclosed is a multiple glazed unit such as shown in FIG. 4. One panel of glass, 1, having coatings according to this invention is mounted in substantially parallel relationship and spaced from another glass panel, 3, with a marginal frame member, 11, holding the panels, which are held in spaced relation by a spacer member, 15, and sealed with material, 13. Laminated articles, as shown in FIG. 5 may be prepared utilizing this invention. A coated glass piece, 1, is laminated to another piece, 3, and adhered with interlayer material, 17, such as polyvinyl butyral or polyurethane.

DESCRIPTION OF THE PREFERRED EMBODIMENTS

Figure 1:
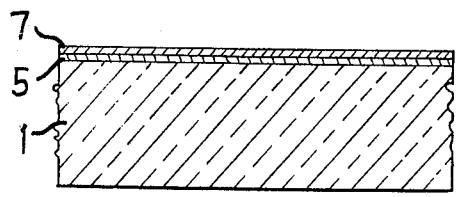
FIG. 1 is a cross-sectional view of a simplified article produced in accordance with the present invention.
Figure 2:
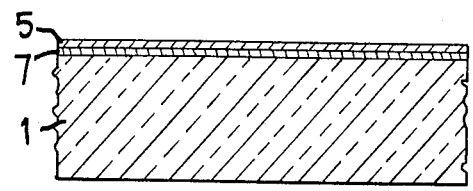
FIG. 2 is a cross-sectional view of an alternative embodiment of the article of FIG. 1.
Figure 3:
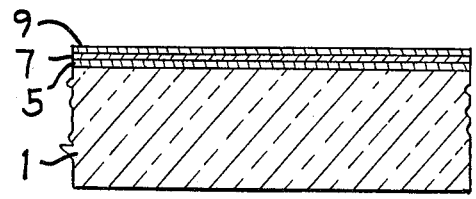
FIG. 3 is a cross-sectional view of an alternative multiple layer embodiment of the present invention.
Figure 4:
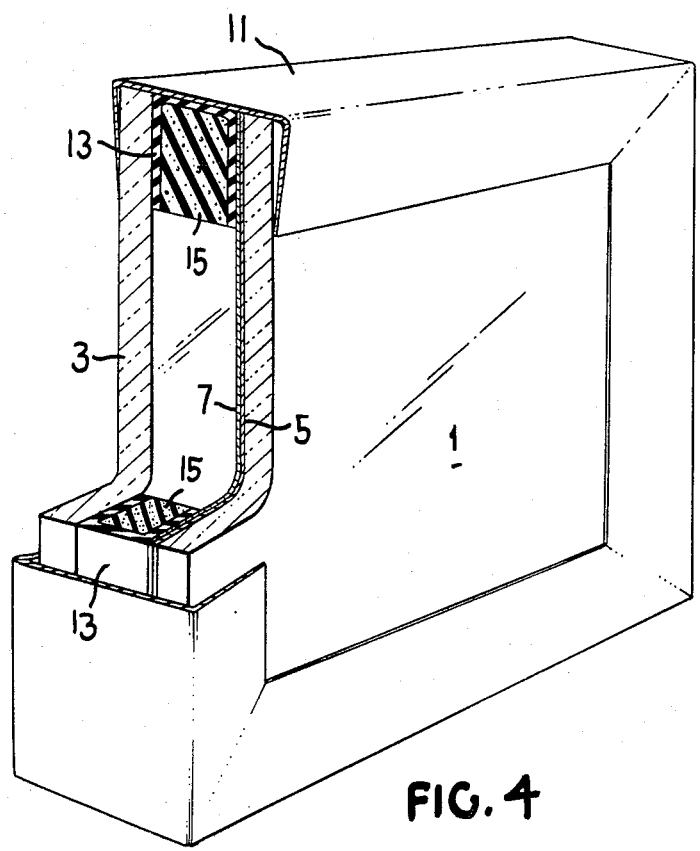
FIG. 4 is a broken perspective view of an insulating glass unit employing a muliple coated glass plate in accordance with this invention.
Figure 5:
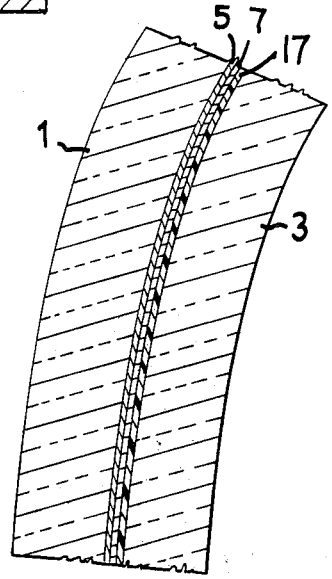
FIG. 5 is a sectional view of a laminated glass article in accordance with this invention.

The preferred embodiment of this invention comprises a glass substrate having one metal coating deposited thereon and one metal oxide coating disposed over the metal coating. The preferred metal for the metal coating is nickel. The nickel coating contains boron in a minor amount. The metal oxide coating is copper oxide. The thickness of each coating varies depending upon the particular reflectance and transmittance characteristics desired.

The best method contemplated for preparing the articles of this invention follows. Prior to applying any coating to the glass surface, the glass surface is cleaned. If the glass to be coated has an imperfect coating which must be removed the initial cleaning step comprises contacting the glass surface with a strong cleansing agent such as those which are conventionally employed for cleaning glass. In particular, chromic acid and other strong acids may be used, although it is preferred to employ solutions of strong oxidizing agents such as peroxides, perborates or permanganates. This initial cleaning, if necessary, is followed by washing the glass with water. While tap water may be employed, it is preferable to use distilled, deionized or demineralized water. Following the wash, the glass surface is blocked or lightly abraded using brushes or felt blockers along with a water mixture containing cerium oxide, silica or other common light abrasive materials. The glass is then again washed with water and rinsed clear.

The cleaned glass is then contacted with a sensitizing agent to make the glass surface receptive to the deposition of metal and to insure that deposited metal will adhere to the glass surface. The preferred method for sensitizing a glass surface comprises contacting the surface with a dilute aqueous solution of a tin salt. While any soluble or water-dispersible tin salt such as stannous bromide, stannous iodide or stannous sulfate may be employed, stannous chloride is a preferred source of tin. A stannous chloride solution having a preferred concentration of stannous chloride of from 0.01 to 0.1 grams per liter is employed, and a solution having a stannous chloride concentration of from 0.06 to 0.09 grams per liter has been found to be particularly useful. The tin solution may be sprayed or permitted to drip onto the glass surface or may be applied using any conventional contacting technique. Applying the solution from a pipe having orifices disposed along its length and allowing the solution to drip onto the glass has been found to be particularly simple and trouble-free. Following contact of the glass with a tin solution, the glass is again rinsed with water. A variety of conventional techniques may be employed for spraying rinse water against the glass, although it has been found particularly beneficial to employ crossfire rinse applicators to direct the spray generally against the direction of glass travel on a conveyor while traversing the glass perpendicular to its direction of travel. Such an arrangement is the subject of applicant's copending application Ser. No. 159,746, filed July 6, 1971 now U.S. Pat. No. 3,793,054 issued Feb. 19, 1974, which is incorporated herein by reference.

Following rinsing, the glass surface is contacted with a noble metal solution to further prepare the surface for receiving a coating. The preferred solution for employment in this step is a palladious chloride solution having a concentration of palladious chloride of from 0.005 to about 1.0 grams palladium chloride per liter of solution together with an equal amount of hydrochloric acid. This solution may be applied to the glass by techniques similar to those for application of the tin solution, such as spraying or dripping. Following contact of the glass with a palladium solution, the glass is again rinsed with a rinse water preferably applied using crossfire rinse applicators as before indicated.

Following the palladium treatment and its accompanying rinse, the glass is then contacted with a composition suitable for depositing a nickel coating onto the glass surface. The preferred method for depositing nickel is that disclosed in the commonly assigned copending application entitled "wet Chemical Method of Producing Transparent Metal Films" to R. G. Miller, application Ser. No. 57,754, filed June 23, 1970. Briefly, the nickel deposition step involves intermixing two separate solutions, one a nickel-containing solution, and another, a reducing solution containing a boron-containing reducing agent, and contacting the glass with the intermixed solution so that the reducing agent reduces the nickel, depositing it onto the glass. The preferred separate solutions are formulated as follows:

| Nickel Solution | |
|---|---|
| Nickelous acetate | 0.5 to 50 grams per liter |
| Boric acid | 0.5 to 35 grams per liter |
| Sodium gluconate | 1.0 to 75 grams per liter |
| Hydrazine sulfate | 0.1 to 5.0 grams per liter |
| Ammonium hydroxide | to adjust pH to 7.0 to 10.5 |
| Wetting agent | |
| Ethomeen C-20* | 0.01 to 1.0 grams per liter |

*Sold by Armour & Co. and consisting of:

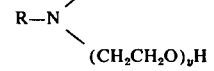

where R is derived from cocoamine and $x + y = 10$

| Reducing Solution | |
|---|---|
| Sodium borohydride | 0.1 to 25 grams per liter |
| Sodium hydroxide | to adjust pH to 10 to 12.5 |
| Wetting agent | |
| Ethomeen C-20* | 0.01 to 1.0 grams per liter |

*Sold by Armour & Co.

Preferably the two solutions are sprayed at equal rates so that the spray fans intersect at or near the surface of glass to be coated. After spraying the two solutions to intermix at the glass surface, the glass is conveyed from under the spray applicators and the reacting composition is allowed to remain as a puddle or pool on the top surface of the glass while deposition continues. The glass is then rinsed with water as before. The nickel deposition step may be repeated until the desired nickel-boron film thickness is attained as indicated by visible light transmittance or by any other convenient technique. Following a final rinse, the nickel-containing coating may be air dried but preferably is allowed to remain wet. The nickel surface is then treated with a palladium salt solution as described before. It is then rinsed with water.

The nickel coating surface is then contacted with an aqueous alkaline copper filming solution containing a water-soluble or water-dispersible copper salt, a reducing agent and an alkaline pH control agent, the salt of the metal selected from the group consisting of nickel and cobalt. The preferred copper solution comprises two solutions, which are described as concentrates which are diluted with water immediately before application. The first concentrate is a copper salt solution comprising a copper salt such as copper sulfate in an amount of from about 50 to 80 grams per liter. The second metal salt is nickel sulfate in an amount from about 15 to 30 grams per liter, along with a reducing agent, such as formaldehyde, in an amount of from about 400 to 550 cc. per liter. The second concentrate comprises a pH control agent, such as sodium hydroxide, in an amount from about 70 to 100 grams per liter and a Rochelle salt in an amount from about 250 to 350 grams per liter. These concentrates are diluted with water in ratios from about 1 part of copper solution to 1 part of Rochelle salt solution to 4 parts of water to about 1 part copper solution to 1 part Rochelle salt solution to 10 parts of water to provide relatively thick copper coatings suitable for oxidation. The preferred dilution ratio is from about 1:1:5 to about 1:1:8 and a dilution ratio of 1:1:6 is most preferred. The copper solution is applied by dripping from a drip pipe as described above for tin application, although other application techniques, such as spraying, pouring or brushing, for example might also be conveniently employed. Following contact of the article with this copper filming composition, the article is again rinsed with water and may be dried by air.

Following this, the copper film is contacted with an aqueous solution containing an adsorbing surfactant. This surfactant solution preferably contains from about 0.05 to 5 percent by weight of surfactant and sorbitan monolaurate is the preferred surfactant. The surfactant solution is applied by pouring, spraying or dripping, and may, after a short contact time, be rinsed from the plate with a water rinse. The article is then dried.

The coated article is then heated in an oxidizing atmosphere at a temperature above about 300°F, preferably between about 400° to 600°F, and most preferably about 450°F. The coated article is maintained at that temperature for a period from about 5 to 20 minutes, preferably about 10 minutes. This treatment results in a copper oxide coating over a metallic nickel coating disposed on a glass substrate. The resulting article is observed to selectively reflect and transmit light as evidenced by its apparent difference in reflected and transmitted color.

The preferred embodiments of this invention may be more fully understood from the examples described below.

EXAMPLE I

Plates of clear soda-lime-silica glass, ¼ inch thick and measuring 54 inches by 78 inches, were coated with nickel and copper as described above, using the following preferred solutions:

| Tin Solution | Preferred | Range |
|---|---|---|
| Stannous chloride | 0.2 gram | .02 – .4 gram |
| Hydrochloric acid (12N) | 0.04 milliliter | .04 – .06 milliliter |
| Water | added to 1 liter | added to 1 liter |
| Palladium Solution | Preferred | Range |
| Palladious chloride | 0.02 gram | .02 – .04 gram |
| Hydrochloric acid (12N) | 0.04 milliliter | .02 – .04 milliliter |
| Water | added to 1 liter | added to 1 liter |
| Nickel Solution | Preferred | Range |
| Nickelous acetate | 5 grams | 4 – 10 grams |
| Boric acid | 2.5 grams | 2 – 5 grams |
| Sodium gluconate | 9.0 grams | 7 – 18 grams |
| Hydrazine sulfate | 0.5 grams | .4 – 1.0 grams |
| Water | added to 1 liter | |
| Ammonium hydroxide | added to pH 7.2 | pH 7.0 – 7.6 |
| Ethomeen C-20* | 1 drop per liter of solution | 0 – 2 drops |
| Acetone | .01 gram | 0 – 100 grams |
| Reducer Solution | Preferred | Range |
| Sodium borohydride | 0.5 gram | .4 – 1.0 grams |
| Water | added to 1 liter | added to 1 liter |
| Sodium hydroxide | added to pH 11.5 | pH 11 – 11.6 |
| Ethomeen C-20* | ½ drop per liter | 0 – 2 drops |

*Sold by Armour & Co.

The plates were coated with nickel by conveying them along a conveyor while sequentially contacting the upper surface of the plate with reactant solutions and rinses as described above. The treatment sequence corresponded to the treatment described in copending application entitled "Wet Chemical Method for Producing Transparent Metal Films" of R. G. Miller. The thickness of the nickel films was about 225 Angstroms, and the nickel film-glass combination had a visible light transmittance of about 19 percent.

Following the nickel coating, the plates were rinsed and conveyed beneath the tin and palladium applicator once again. Stannous chloride sensitization and palladium chloride activation were the same as before. A copper solution prepared from a first concentrate containing 60 grams of copper sulfate per liter, nickel sulfate as 20 grams per liter and formaldehyde in an amount of 470 cc. per liter and a Rochelle salt concentrate containing 88 grams per liter of sodium hydroxide and 290 grams per liter of Rochelle salt were diluted with water in a ratio of 1:1:6 and applied to the nickel-coated surface from an oscillating drip pipe at a rate of 6,000 milliliters per minute and allowed to contact the surface for about 5 minutes. This copper solution was then rinsed off with water. Following rinsing, the plate was air dried. At this point in the process, the nickel-copper coating combination on the glass appeared copper color in reflectance from the coated surface and bluish-gray in reflectance from the glass surface. The luminous transmittance was 3 to 4 percent. A solution of surfactant was dripped onto the metal coating and maintained there for one minute. The solution was then rinsed off with water and the plate was dried with air. The surfactant was present in this surfactant solution as 0.1 percent, and the surfactant employed was that sold by Fisher Scientific Company under the name FL-70. This surfactant is a non-ionic surfactant comprising a mixture of sodium carbonate, ethylene diamine tetraacetic acid, fatty acid-ethoxylated adducts, ethylene glycol and a sulfated quaternary ammonium compound. The dried surface was observed to be water repellent. Twelve (12) inch by 12 inch samples were cut from the plates for further treatment.

The 12 inch by 12 inch samples were placed in a small furnace and heated in air for 20 minutes at 450°F to convert the copper layer on the nickel film into a transparent film of copper oxide. The resulting film combinations appeared bright bronze to a deep bronze in reflectance from the glass side of each of the combinations and bluish-green to green in reflectance from the coated side of the combination. The samples were bronze in transmittance. The copper oxide layer was determined to be about 700 and 900 Angstroms in thickness. The copper layer prior to oxidation was determined to be about 230 to 300 Angstroms in thickness. The overlaid layer of copper oxide was stripped from some of the samples by contacting the samples with an aqueous solution of ammonia (5% to 10% by weight). The underlying nickel coating was observed to be unchanged with the glass-nickel coating combination having a visible light transmittance of 19 percent, both before application of the coppering solution and after removal of the copper oxide film after treatment. For stripping metallic copper an aqueous solution of 5% ammonia and 1% hydrogen peroxide was employed.

EXAMPLE II

Glass plates were coated with nickel and copper as described in Example I, except that the copper solution was allowed to contact the substrate for 1.25 to 1.5 minutes before being rinsed off. The luminous transmittance of the glass-metallic nickel-metallic copper combination was 16 to 17 percent. The glass plates were contacted with surfactant as in Example I and were dried with air. Four inch by four inch samples were cut from the plates and heat treated in air as in Example I for 20 minutes at 450°F. The resulting articles appeared bright greenish-silver in reflectance from the glass side and violet in reflectance from the coated side, while being greenish-gray in transmittance. As in Example I, the underlying nickel coating was observed to be unchanged when the copper oxide coating had been stripped from the articles. The samples had a copper oxide layer thickness of about 300 Angstroms and the copper film prior to oxidation was about 100 Angstroms thick.

EXAMPLE III

Plates were coated as in Examples I and II except that the copper solution was permitted to contact the nickel-coated glass for three minutes and then rinsed off. The resulting metallic nickel-metallic copper glass combination had a luminous transmittance of 7.4 percent. Four inch by four inch samples cut from the plates and treated with surfactant were heated for 40 minutes at 360°F. The resulting combination appeared golden in reflectance from the glass side, blue in reflectance from the coated side and golden in transmittance. The luminous transmittance was 24.5 percent compared to 19.9 percent for the underlying nickel coating in combination with the glass. In stripping off the copper oxide from the sample as described above indicated that the underlying nickel coating was unchanged by the heat treatment. The reflectance from the glass side was 40.4 percent. The coated samples which appear golden in reflectance from the glass side were samples having copper oxide films of 550 to 700 Angstroms in thickness. The copper films corresponding to these copper oxide films had thicknesses of 180 and 230 Angstroms, respectively. It was observed that equivalent results could be obtained by heating samples for 15 minutes at 450°F.

In accordance with this invention monolithic glass articles having a variety of colors may be prepared. In four particularly preferred embodiments employing nickel and copper oxide soda-lime-silica glass plates are provided with a greenish-silver, a greenish-gold, a gold and a bronze appearance in reflection from the glass side. The properties of these preferred embodiments are:

| Apparent Color | Greenish-Silver | Greenish-Gold | Gold | Bronze |
| --- | --- | --- | --- | --- |
| Thickness of CuO, A | 200 – 350 | 350 – 500 | 500 – 700 | 700 – 900 |
| Transmittance | | | | |
| Luminous Transmittance, % (Tristimulus-Y) | 23 – 25 | 21 – 23 | 12 – 21 | 7.5 – 12 |
| Excitation Purity, % | 8 – 21 | 21 – 35 | 35 – 40 | 38 – 44 |
| Dominant Wavelength, nm. | 566 – 570 | 570 – 573.5 | 573.5 – 576 | 575 – 576 |
| Reflectance from Glass Side | | | | |
| Luminous Reflectance, % (Tristimulus-Y) | 32 – 35.5 | 35.5 – 38.5 | 31 – 40 | 25 – 31 |
| Excitation Purity, % | 2.5 – 8 | 8 – 14 | 14 – 19 | 10 – 19 |
| Dominant Wavelength, nm. | 465 – 515 | 515 – 555 | 555 – 578 | 578 – 590 |

Figure 6:
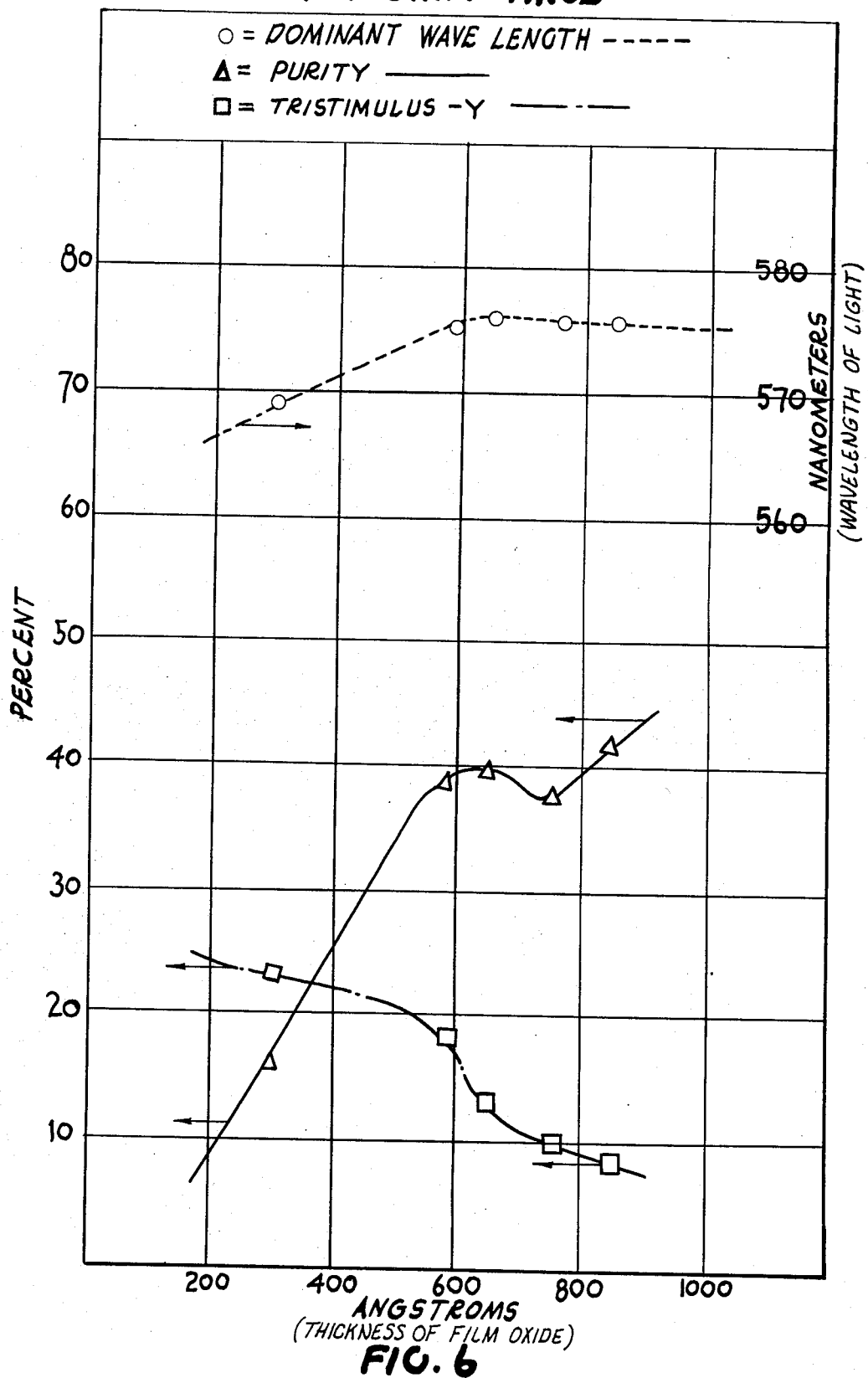
FIGS. 6 and 7 are plots of transmittance and reflectance characteristics of coatings versus metal oxide coating thickness for articles comprising the preferred embodiments according to this invention, particularly monolithic articles including the color characteristics of preferred embodiments according to this invention In the drawings, where like reference numbers indicate similar elements, the articles of this invention are shown. A preferred embodiment of a monolithic article according to this invention is shown in cross-section in FIG. 1. A substrate, 1, preferably transparent and more preferably glass, has disposed thereon a coating or film layer, 5, which is substantially metallic, which, in turn, has disposed thereon a coating or film layer, 7, which is substantially a metal oxide. The relationship of the metal layer, 5, and the oxide layer 7, may be altered with respect to the substrate, 1, as illustrated in FIG. 2.
Figure 7:
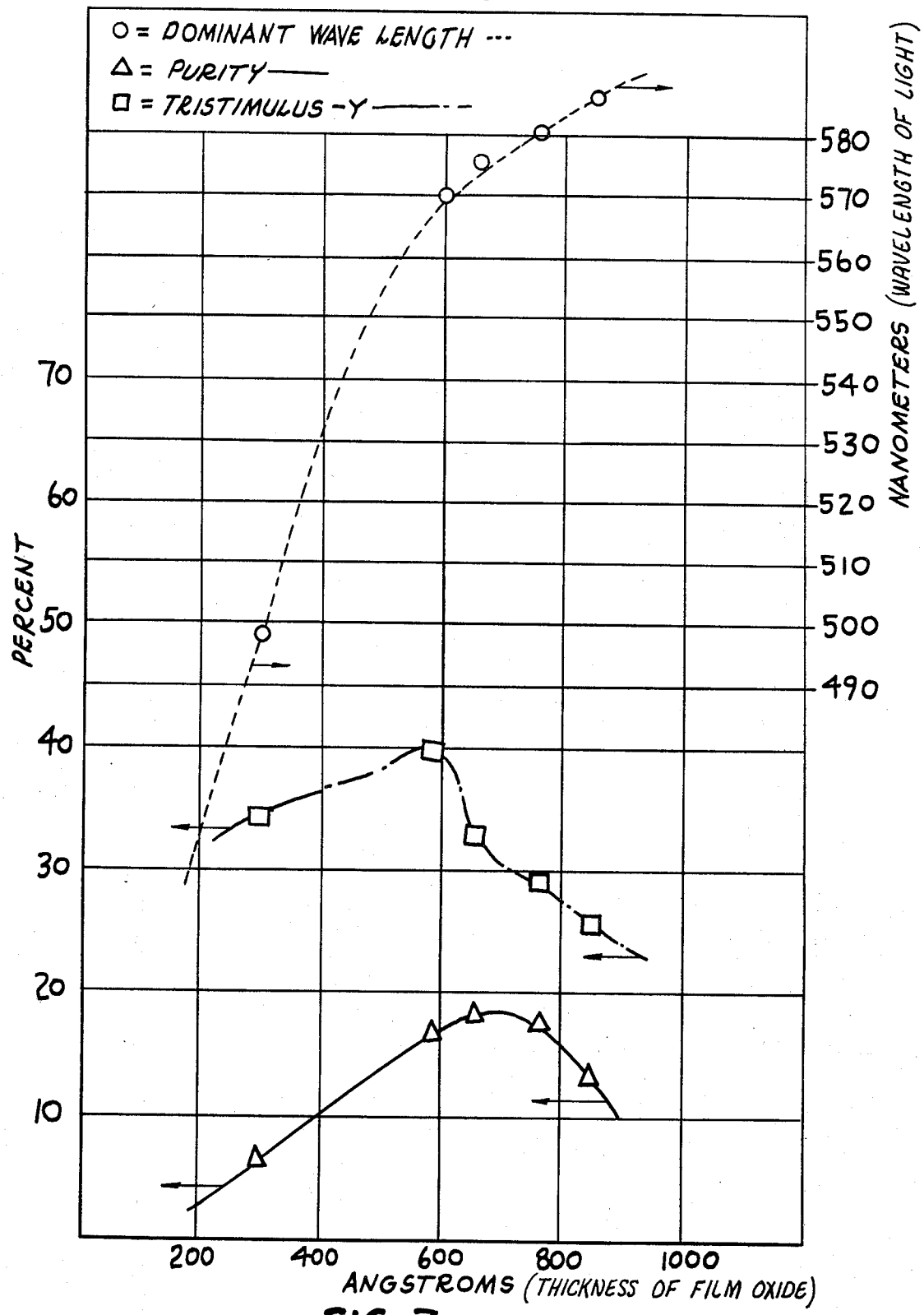

The characteristics of these preferred embodiments are shown in FIGS. 6 and 7 with the properties shown as continuous functions. The dominant wavelengths for these embodiments are expressed in nanometers, the excitation purities in percent and the luminous transmittance (or reflectance) or Tristimulus-Y values in percent. The properties are based upon glass substrates one-quarter inch thick having a luminous transmittance of 88 percent and a underlying nickel-boron layer providing a glass-nickel combination transmittance of 19 to 20 percent. The optical characteristics of the coated articles are expressed according to conventional colorimetric principles and are related to the metal oxide coating thickness in angstroms.

In the preparation of the articles of this invention it is preferred that iron, cobalt, or nickel be deposited by electroless plating in accordance with the methods described in the related copending applications of R. G. Miller. It is preferred that chromium be applied by vacuum vapor coating or cathodic sputtering. It is preferred that silver or copper be applied by methods in accordance with the teachings of U.S. Pat. No. 3,457,138 to R. G. Miller. In the examples which follow several embodiments of this invention are described.

EXAMPLE IV

Nickel films are deposited on glass plates as in Example I by contacting the plates for 60 seconds with nickel salt solution. The films are treated with tin chloride solutions as in Example I but not with a palladium salt solution as in Example I. The films are then spray contacted with a solution identical to the nickel solution except that the nickel salt is replaced with an iron salt. Some specimens are contacted for 3 minutes and some for 5 minutes. The resulting iron films are treated with an adsorbing surfactant as in Example I, and the articles are heated to oxidize the iron. The heat treatment is carried out at about 660°F (600°F should be the minimum temperature used). The resulting articles exhibit interference colors in reflectance from either surface, being blue-green to brown depending upon the length of iron salt contact time.

EXAMPLE V

An iron film is deposited on glass in a manner similar to the deposition of nickel in Example I; the iron salt solution is identical to the nickel salt solution except for the substitution of an iron salt for the nickel salt. The iron film is then activated with palladium, and a layer of copper is deposited on the iron film as in Example I. The copper film is then treated with an adsorbing surfactant and heated to oxidize the copper layer. The resulting article exhibits interference colors in reflectance from either surface.

EXAMPLE VI

A chromium film is deposited on glass by cathode sputtering in an argon atmosphere of about 10 to 40 millitorr using a chrome plated cathode operating at about −4Kv. The coated article is subjected to palladium activation as in Example I. A copper film is deposited over the chrome, treated with surfactant and oxidized as in Example I. The resulting article exhibits interference colors when viewed toward either surface.

EXAMPLE VII

A cobalt film is deposited on glass in a manner identical to the deposition of nickel in Example I except for the substitution of a cobalt salt for the nickel salt in the metal-containing solution. The cobalt film is activated with palladium as in Example I. A copper film is deposited over the cobalt, treated with surfactant and oxidized as in Example I. The resulting article exhibits interference colors when viewed toward either surface.

EXAMPLE VIII

Silver films are deposited on glass by reducing silver according to the method described in U.S. Pat. No. 3,457,138. The coated specimens have light transmittances of 25, 30 and 40 percent. The silver films are activated with palladium as in Example I. A copper film is deposited over the silver, treated with surfactant and oxidized as in Example I for one hour at about 400°F. The resulting articles exhibit interference colors when viewed toward either surface. Colors ranging from gold to blue are observed in reflection depending upon the thickness of the underlying silver film.

EXAMPLE IX

Copper films are deposited on glass substrates and the copper oxidized in the manner described above. Coated specimens are further coated with chromium, nickel, cobalt or iron by cathode sputtering. The resulting articles exhibit interference colors.

When the underlying layer of coating is an oxide, it is preferable to apply an overlayer by sputtering or vapor deposition or by reduction using a relatively weak reducing agent such as a hypophosphite, borazole, borane or borazene in order to avoid reducing the underlayer to metal. When employing electroless plating techniques to deposit a metal over a metal oxide it is preferable to overcoat iron oxide rather than copper oxide for it is easier to maintain the oxide as an oxide without substantial reduction at the oxide-metal interface. It has been found that copper metal may be applied over iron oxide by electroless plating.

The thickness of a copper film which is applied may be precisely controlled by controlling the concentration of reactants in the copper solution and controlling the contact time between the coppering solution and the substrate being coated. Since oxidation of the copper film results in a film thickness growth of about a factor of three, wide ranges in thickness are possible by controlling the deposition of copper, and the precision of coppering thickness control is adequate to precisely control the thickness of the copper oxide film despite this thickness growth.

Included within the scope of this invention are articles wherein the oxide layer includes elements such as tin, zinc and cadmium which alloy with copper. For example tin, zinc or cadmium may be deposited over copper by electroless or electrolytic techniques and caused to migrate into the copper layer during oxidation.

While this invention has been described with particular reference to preferred embodiments, those skilled in the art will recognize variations and modifications which are encompassed by the concepts of this invention and by the claims which follow.

I claim:

1. In the preparation of a metal oxide comprising heating a metal to be oxidized in an oxidizing atmosphere to a temperature of at least about 300°F, the improvement comprising contacting the metal with a surfactant which renders the surface of the metal hydrophobic when dried in air and then drying the contacted metal prior to heating the metal to a temperature of at least about 300°F.

2. The method according to claim 1 wherein the metal to be oxidized comprises a substantially metallic coating disposed upon a non-metallic substrate and the metal and substrate are heated throughout to a temperature between about 300°F, and a temperature at which the substrate on which the metal is disposed would be distorted.

3. The method according to claim 2 wherein the substrate is transparent, the substantially metallic film is transparent and the heating is continued until the metal is substantially completely oxidized uniformly over its entire area to make a metal oxide which is observable as having substantially uniform visible light transmittance over its entire area.

4. The method according to claim 3 wherein the metal to be oxidized is selected from the group consisting of copper, aluminum, iron, cobalt, nickel and mixtures thereof and, in the step of contacting the metal with a surfactant which renders the surface of the metal hydrophobic when dried in air, the metal is contacted by a surfactant that is a non-ionic surfactant.

5. The method according to claim 4 wherein the metal to be oxidized is copper and, in the step of contacting the metal with a surfactant which renders the surface of the metal hydrophobic when dried in air, the metal is contacted by sorbitan monolaurate.

6. The method according to claim 1 wherein, in the step of contacting the metal with a surfactant which renders the surface of the metal hydrophobic when dried in air, the metal is contacted by the surfactant in an aqueous solution which contacts the metal to be oxidized.

7. The method according to claim 1 wherein, the step of contacting the metal with a surfactant which renders the surface of the metal hydrophobic when dried in air, the surfactant is selected from the group consisting of sorbitan monolaurate, acetylene glycol 2,4,7,9-tetramethyl-5 decyne-4,7 diol and mixtures of sodium carbonate, ethylene diamine tetraacetic acid, fatty acid-ethoxylated adducts, ethylene glycol and sulfated quaternary ammonium compounds.

* * * * *